United States Patent
Rogers

(10) Patent No.: US 9,808,865 B2
(45) Date of Patent: Nov. 7, 2017

(54) METHOD FOR MANUFACTURING A METALLIC COMPONENT

(71) Applicant: SOLAR TURBINES INCORPORATED, San Diego, CA (US)

(72) Inventor: Thomas John Chipman Rogers, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 349 days.

(21) Appl. No.: 14/610,063

(22) Filed: Jan. 30, 2015

(65) Prior Publication Data
US 2016/0222791 A1 Aug. 4, 2016

(51) Int. Cl.
B22F 3/105 (2006.01)
B22F 5/04 (2006.01)
B22F 3/10 (2006.01)
B22F 5/00 (2006.01)

(52) U.S. Cl.
CPC ............ B22F 3/1055 (2013.01); *B22F 5/009* (2013.01); *B22F 5/04* (2013.01); *B22F 2003/1058* (2013.01); *F05D 2230/00* (2013.01); *F05D 2300/175* (2013.01); *F05D 2300/60* (2013.01); *Y02P 10/295* (2015.11)

(58) Field of Classification Search
CPC ............ B22F 2003/1058; C04B 35/64; C04B 35/62218
See application file for complete search history.

(56) References Cited

U.S. PATENT DOCUMENTS

| 3,475,229 A | 10/1969 | Geen |
| 3,666,252 A | 5/1972 | Rice |
| 4,035,604 A | 7/1977 | Meleka et al. |
| 6,713,016 B2 * | 3/2004 | Kaercher ............. B23D 79/005 266/48 |
| 2011/0241947 A1* | 10/2011 | Scott ..................... B22F 3/1055 343/700 MS |
| 2015/0034266 A1* | 2/2015 | Bruck .................... B22D 19/10 164/69.1 |

FOREIGN PATENT DOCUMENTS

GB             1383955 A     2/1974

\* cited by examiner

*Primary Examiner* — Colleen Dunn
*Assistant Examiner* — Rajinder Bajwa
(74) *Attorney, Agent, or Firm* — Procopio, Cory, Hargreaves & Savitch LLP

(57) ABSTRACT

A method for manufacturing a metallic component is disclosed. The method includes forming a metallic component with a support structure using an additive manufacturing process. The support structure includes support walls arranged to form flow passages with a predetermined cross-sectional area. The method also includes placing the metallic component with the support structure into a chamber and sealing the chamber. The method further includes introducing a fuel mixture into the chamber after sealing the chamber. The method still further includes igniting the fuel mixture in the chamber to remove one or more of the support walls of the support structure from the metallic component.

20 Claims, 3 Drawing Sheets

METHOD FOR MANUFACTURING A METALLIC COMPONENT

TECHNICAL FIELD

The present disclosure generally pertains to manufacturing metallic components for industrial machines, such as gas turbine engines, with additive manufacturing, and is directed toward removing the support structure from the metallic component used during the additive manufacturing process.

BACKGROUND

Metallic components for industrial machines, such as gas turbine engines, may include complex shapes and various internal passages. During additive manufacturing processes these complex shapes and internal passages may require support structures. Removing the support structures may be time consuming and expensive, especially for internal passages.

U.S. Pat. No. 3,475,229 to H. Green et al. discloses a sealed system process for the elimination (destruction or removal) of superfluous projections, such as unwanted burrs and sharp edges, on shaped or fabricated articles of manufacture, particularly those produced by mechanical shaping or fabricating, by treatment with transient elevated gaseous temperatures in a sealed and confined space.

The present disclosure is directed toward overcoming one or more of the problems discovered by the inventors.

SUMMARY OF THE DISCLOSURE

A method for manufacturing a metallic component is disclosed. In embodiments, the method includes forming a metallic component with a support structure using an additive manufacturing process. The support structure includes support walls arranged to form flow passages with each of the flow passages including a cross-sectional area that is large enough to allow a fuel mixture and a flame to propagate there through without choking the flow and flame propagation. The method also includes placing the metallic component with the support structure into a chamber and sealing the chamber. The method further includes introducing a fuel mixture into the chamber after sealing the chamber. The method still further includes igniting the fuel mixture in the chamber to remove one or more of the support walls of the support structure from the metallic component.

DETAILED DESCRIPTION

The methods disclosed herein include a process for manufacturing a metallic component for industrial machines, such as gas turbine engines. The metallic component includes various internal passages and surfaces that require a support structure during an additive manufacturing process. In embodiments, the method includes configuring the support structure with a thin walled lattice arrangement that includes internal flow passages and producing the metallic component with an additive manufacturing process. The method also includes rapidly heating the metallic component with the support structure in a material removal chamber with an explosive gas mixture in one or more short bursts. When ignited, the explosion travels through the internal flow passages providing enough energy to burn off the thin walls of the lattice arrangement and remove the support structure from the metallic component. Removing the support structure from a metallic component with an explosive gas mixture, especially the support structure within internal passageways, may reduce the overall manufacturing costs and may simplify the support structure removal process.

Figure 1:
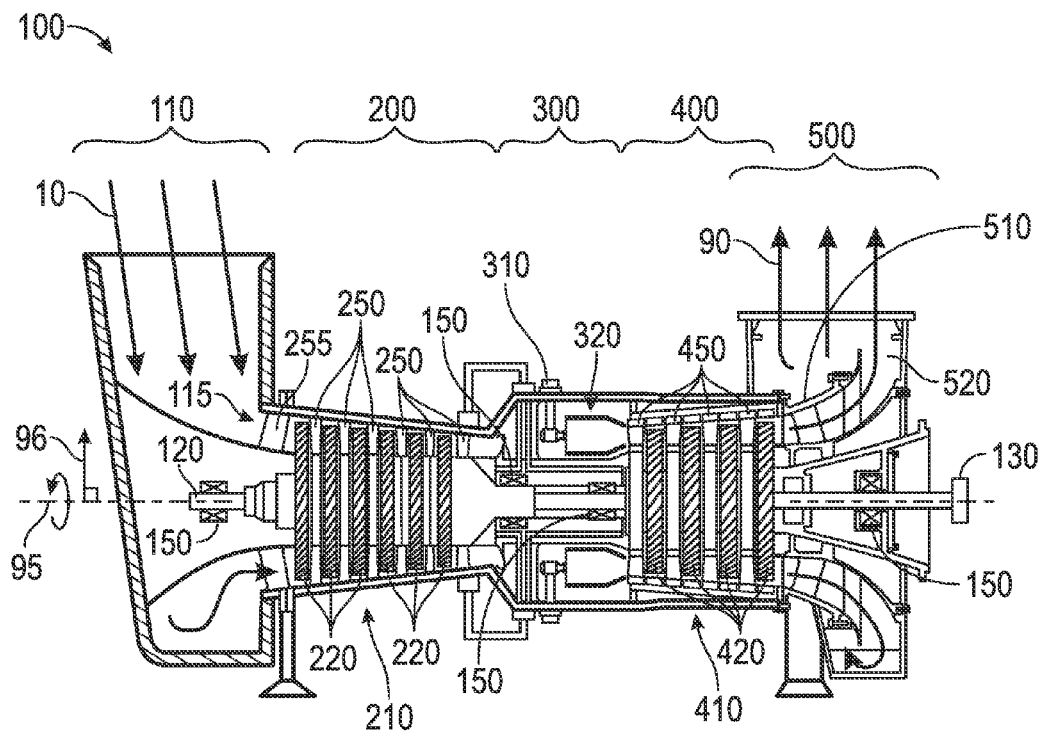
FIG. 1 is a schematic illustration of an exemplary gas turbine engine.

FIG. 1 is a schematic illustration of an exemplary gas turbine engine. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a shaft 120, a gas producer or compressor 200, a combustor 300, a turbine 400, an exhaust 500, and a power output coupling 130. The gas turbine engine 100 may have a single shaft or a dual shaft configuration.

The compressor 200 includes a compressor rotor assembly 210, compressor stationary vanes ("stators") 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the first compressor stage.

The combustor 300 includes one or more injectors 310 and a combustion chamber 320.

The turbine 400 includes a turbine rotor assembly 410, and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. A turbine nozzle 450 axially precedes each of the turbine disk assemblies 420. Each turbine disk assembly 420 paired with the adjacent turbine nozzle 450 that precedes the turbine disk assembly 420 is considered a turbine stage. Turbine 400 includes multiple turbine stages.

The exhaust 500 includes an exhaust diffuser 510 and an exhaust collector 520.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

Conventional manufacturing processes (casting, machining, etc.) for manufacturing metallic components for industrial machines, such as the gas turbine engine of FIG. 1, may result in a large quantity of scrap materials, which may result in an increase in manufacturing costs, especially for metallic components made from superalloys. Conventional manufacturing processes may also limit the design of a metallic component, such as limiting the design of a flow passage extending through the metallic component. Additive manufacturing can be used to produce machine components with minimal scrap materials or waste and can be used to produce internal passages that cannot be produced using other methods. However, overhanging surfaces, such as those extending at an angle that is less than 45 degrees relative to the build plate may require a support structure. Without the support structure, the overhanging surface may deform and may not hold its desired shape.

Figure 2:
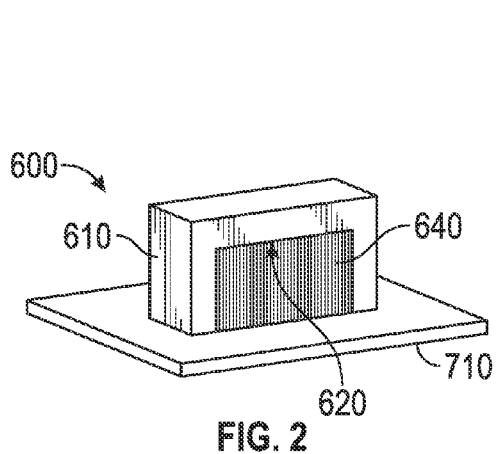
FIG. 2 is a perspective view of an exemplary metallic component on a build plate.

FIG. 2 is a perspective view of an exemplary metallic component 600 on a build plate 710. The build plate 710 is used as part of an additive manufacturing machine. The additive manufacturing machine generally includes the build plate 710 and a nozzle. The build plate 710 supports the metallic component 600 during the manufacturing process, such as while forming the metallic component 600. The nozzle may provide the feedstock and may include a laser for melting the feedstock to be added to the metallic component 600.

The metallic component 600 may include a body 610 and an overhanging surface 620 that is unsupported by body 610 during some portion of the additive manufacturing process. A support structure 640 is configured to support the overhanging surface(s) 620 unsupported by body 610 or by build plate 710.

Figure 3:
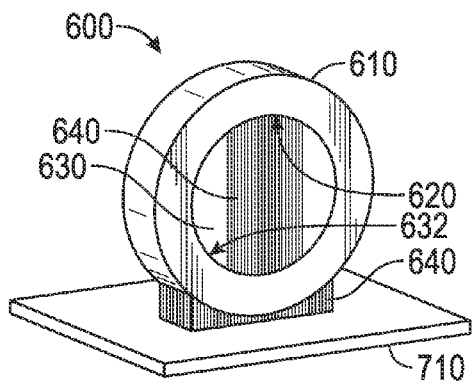
FIG. 3 is a perspective view of an alternate embodiment of the exemplary metallic component of FIG. 2 on the build plate.

FIG. 3 is a perspective view of an alternate embodiment of the exemplary metallic component 600 of FIG. 2 on the build plate 710. In the embodiment illustrated, metallic component 600 includes an internal passage 630 extending through body 610. In other embodiments, internal passage 630 can extend partially through or within body 610. Internal passage 630 includes a passage surface 632. A portion of passage surface 632 may be an overhanging surface 620 unsupported by body 610 during some portion of the additive manufacturing process.

Figure 4:
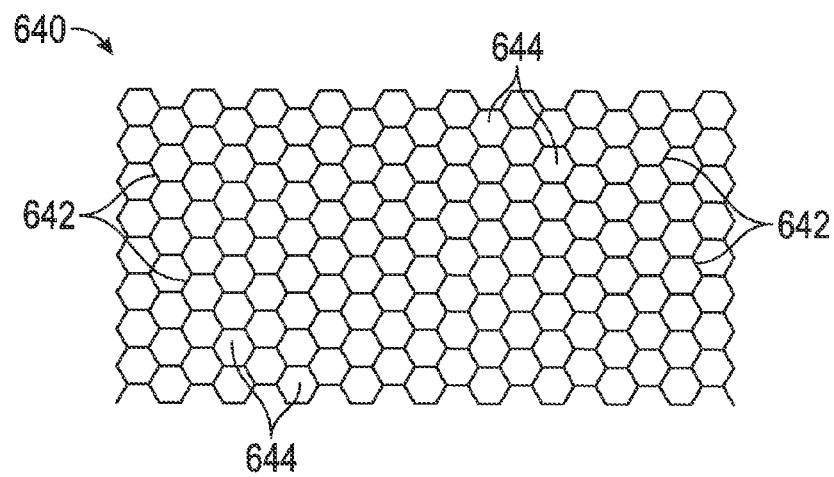
FIG. 4 is a cross-sectional view of a portion of the support structure of the metallic component of FIG. 2.

FIG. 4 is a cross-sectional view of a portion of the support structure 640 of the metallic component 600 of FIG. 2. Support structure 640 includes support walls 642. The support walls 642 may be thin walls configured so that the entirety of the support wall 642 is burned off when exposed to an ignited fuel air mixture. In one embodiment, support walls 642 have a thickness up to 508 microns (0.020 inches). In other embodiments, support walls 642 have a thickness from 50.8 microns (0.002 inches) to 508 microns (0.020 inches).

The support walls 642 are arranged to form flow passages 644 there between. In embodiments, the support walls 642 form a lattice structure. The flow passages 644 may have the shape of a regular polygon or other symmetrical shapes. In the embodiment illustrated, the support walls 642 form flow passages 644 with hexagonal cross-sections. The flow passages 644 include cross-sectional areas that are large enough to allow a fuel mixture and a flame to propagate through the flow passage 644 without choking the flow and flame propagation.

The lattice structure formed by the support walls 642 may have any orientation. The arrangement of the lattice structure may depend on the support needed for the overhanging surface 620 and on the direction needed for gas to travel through the flow passages 644 formed in the lattice structure. In the embodiment illustrated in FIGS. 2 and 3, the flow passages 644 of the lattice structure for the support structure 640 supporting the overhanging surfaces 620 extend vertically from the build plate 710 up to the overhanging surfaces 620. In other embodiments, the major axes of the flow passages 644 are not parallel to the overhanging surface 620 being supported.

Figure 5:
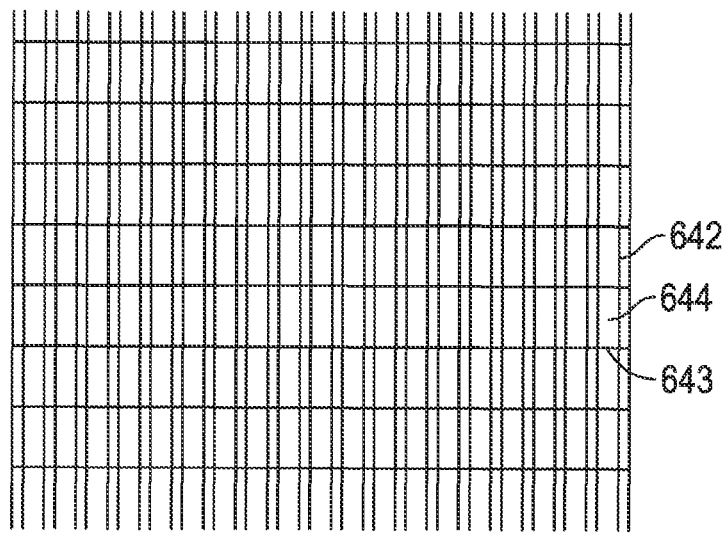
FIG. 5 is a side view of the portion of the support structure of FIG. 4.

FIG. 5 is a side view of the portion of the support structure 640 of FIG. 4. As illustrated, some support structures 640 may require the use of transverse support walls 643 that extend across the lattice structure, such as perpendicular to support walls 642. In the embodiment illustrated, support structure 640 including the support walls 642 and transverse support walls 643 are solid walls. In other embodiments, support structure 640 including support walls 642 and transverse support walls 643 include openings to allow for ingress of a fuel mixture into the flow passages 644 and may allow fuel mixture to pass from one flow passage 644 to another.

Figure 6:
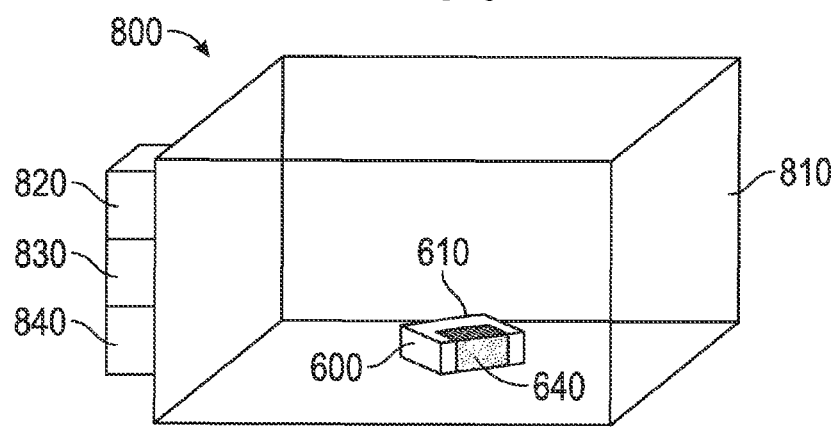
FIG. 6 is a perspective view of the exemplary metallic component of FIG. 2 in a material removal system.

FIG. 6 is a perspective view of the metallic component 600 of FIG. 2 in a material removal system 800. The material removal system 800 may be the same or similar to a system used in a thermal deburring process. The material removal system 800 includes a chamber 810 that is sealable and explosion-proof. The material removal system 800 may also include an air evacuation system 820, a fuel supply system 830, and an igniter 840. The air evacuation system 820 is configured to evacuate the air from the chamber 810 once the metallic component 600 is sealed in the chamber 810. The fuel supply system 830 is configured to supply a fuel mixture to the evacuated chamber 810. The igniter 840, such as an electrical igniter, is configured to ignite the fuel mixture within the chamber 810. The metallic component 600 is oriented within the chamber 810 such that one or more of the flow passages 644 is open to the chamber to allow for the ingress of the fuel mixture into the one or more of the flow passages 644 when the fuel mixture is added to the chamber 810.

INDUSTRIAL APPLICABILITY

Metallic components for industrial machines, such as gas turbine engines, may have intricate shapes including various passages extending through the component. Some of these shapes may include surfaces, such as overhanging surfaces 620 and passage surfaces 632 (see FIGS. 2 and 3) that require support from a support structure 640 during an additive manufacturing process.

Current removal methods for removing the support structure 640 from the metallic component 600 may be limited, time consuming, and/or expensive. For example, abrasive flow machining requires tooling, has a slow material removal rate and cannot be used in all interior surfaces. Die sink electrical discharge machining also has a slow material removal rate and consumes a large quantity of power.

Figure 7:
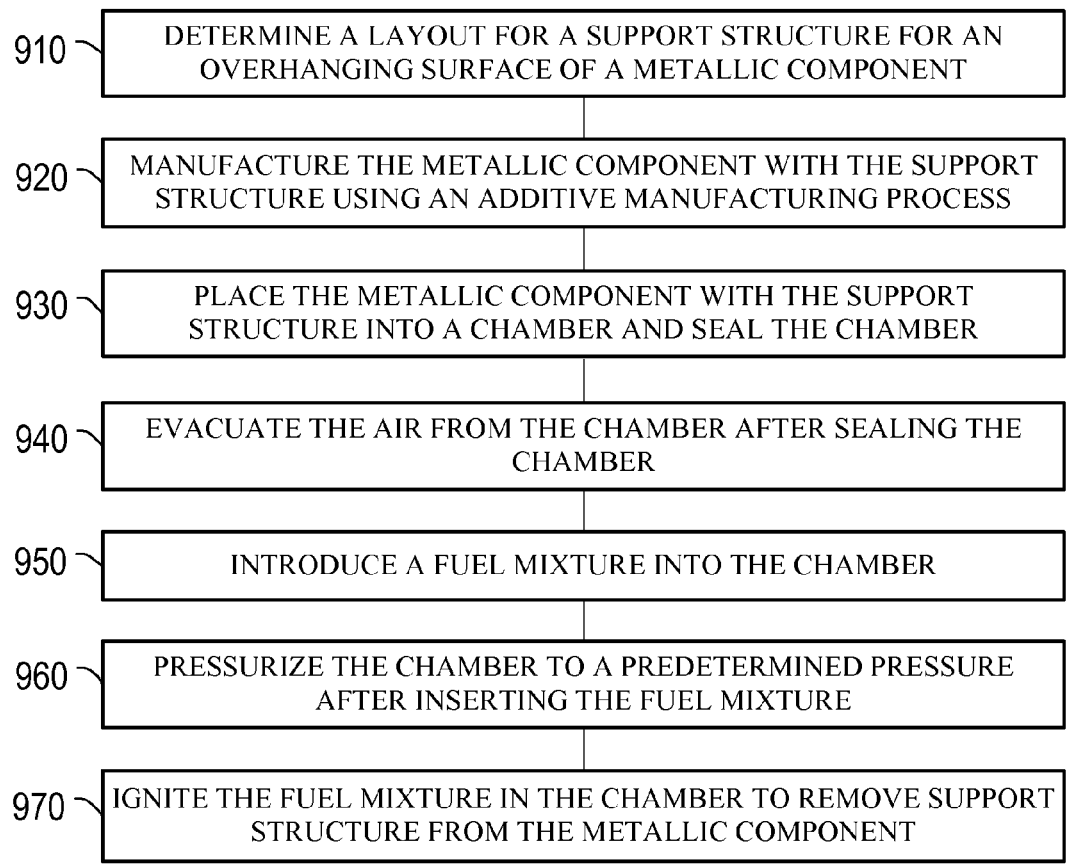
FIG. 7 is a flowchart of a method for manufacturing a metallic component with quick removal of additive manufacturing support structure.

FIG. 7 is a flowchart of a method for manufacturing a metallic component 600 with quick removal of additive manufacturing support structure 640. The method may include a determining a layout for a support structure 640 for an overhanging surface 620 of a metallic component 600 at step 910 (refer to FIGS. 2 and 3). Determining the layout for the support structure 640 may include determining the arrangement of the support walls 642, such as the pattern to be used, determining a thickness for the support walls 642, and determining a cross-sectional area for the flow passages 644, the cross-sectional area being larger than a predetermined amount. The arrangement of the support walls 642 may be a repeating pattern, such as a lattice (refer to FIGS. 4 and 5). The thickness of support walls 642 may be configured so that the entirety of a support wall 642 is burned off when exposed to an ignited fuel air mixture. The predetermined amount is a threshold for the cross-sectional area where one or both of the fuel mixture and flame propagation may choke at a cross-sectional area of the flow passage 644 below that amount.

The method includes forming the metallic component 600 with the support structure 640 using an additive manufacturing process, such as laser powder bed fusion, at step 920. The manufactured support structure 640 includes support walls 642 and flow passages 644, such as those illustrated in FIGS. 2-5. The layout of the support walls 642, the thickness of the support walls 642, the direction of the flow passages 644, and the cross-sectional area of the flow passages 644 may be predetermined, such as those determined at step 910. Each feature that requires support structure 640 may have its own support structure 640. Each support structure 640 used for a metallic component 600 may be oriented differently than others, and may have a different structure, while keeping the support walls 642 equal to or less than 508 microns (0.020 inches).

Generally, the metallic component 600 is manufactured on a build plate 710. As illustrated in FIG. 3, a support structure 640 may also be formed between the body 610 of the metallic component 600 and the build plate 710 to facilitate removal of the metallic component 600 from the build plate 710 without damaging the body 610. This support structure 640 may have the same or similar support walls 642, structure, and flow passages 644 as other support structures 640 used to manufacture the metallic component 600. The metallic component 600 may be removed from the build plate 710 by applying a force to the component or by using a machining process. The support structure 640 may be configured to break off of the build plate 710 when a force is applied.

The method also includes placing the metallic component 600 with the support structure 640 into a chamber 810 and sealing the chamber 810 at step 930 (refer to FIG. 6). The chamber 810 is a sealable and explosion-proof chamber. The chamber 810 may be part of a material removal system 800, such as a system used in a thermal deburring process.

In some embodiments, the method includes evacuating the air from the chamber 810 after sealing the chamber 810 at step 940. Evacuating the air from the chamber 810 may be performed before step 950.

The method further includes introducing a fuel mixture into the chamber 810, such as by inserting or injecting the fuel mixture into the chamber 810, at step 950. The fuel mixture may be a mixture of fuel and oxygen, and may be supplied or drawn into the chamber 810 after evacuating the chamber 810. The fuel mixture may be determined based on the material used for the metallic component 600 and on the temperature needed to burn off the support structure 640 made of said material. Introducing the fuel mixture into the chamber 810 may include introducing the fuel mixture into at least one or more of the flow passages 644.

In some embodiments, the method includes pressurizing the chamber 810 to a predetermined pressure after inserting the fuel mixture at step 960. The predetermined pressure used may also depend on the temperature required to burn off the support structure 640. In embodiments, the predetermined pressure is from 0.5 MPa to 1.9 MPa.

The method yet further includes igniting the fuel mixture in the chamber 810 to remove support structure 640 from the metallic component 600 at step 970. Removing support structure 640 in this manner may be accomplished relatively quickly as the fuel mixture may burn in about 20 milliseconds at temperatures reaching 2,500 degrees Celsius to 3,500 degrees Celsius which may rapidly oxidize the thin walled support structure 640 while leaving the main bulk of body 610 intact and only slightly warmer than it was prior to the process. This method may also reduce the amount of metal scrapped during the manufacturing process as the only metal scrapped is that of the thin support walls 642 burned off during the removal of the support structure 640.

In some embodiments, not all of the support structure 640 will be removed in a single burn or pass. For example, support structure 640 for an arcuate hole extending through a metallic component 600 may not have every flow passage 644 or any flow passage 644 in flow communication with the chamber 810 initially. After a burn is completed, the support walls 642 exposed to the fuel mixture, such as the fuel mixture in the chamber 810 or in open flow passages 644, may burn off and open a set of flow passages 644 to the chamber 810, exposing a subsequent set of support walls 642 to the fuel mixture and flame in a subsequent burn or pass. A combination of steps 940 to 970 may be performed and iterated until all of the support walls 642 are removed from the metallic component 600.

In other embodiments, the support structure 640 can be configured with holes between the flow passages 644 allowing for the fuel mixture and flame to propagate further during a single iteration of steps 940 to 970.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes particular turbine blades and platform seals, it will be appreciated that the turbine blades and platform seals in accordance with this disclosure can be implemented in various other configurations, can be used with various other types of gas turbine engines, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A method for manufacturing a metallic component, the method comprising:

forming the metallic component with a support structure using an additive manufacturing process, the support structure including support walls arranged to form flow passages with each passage including a cross-sectional area that is large enough to allow a fuel mixture to flow there through and a flame to propagate there through without choking the flow of the fuel mixture and without choking the flame propagation;

placing the metallic component with the support structure into a chamber and sealing the chamber;

introducing the fuel mixture into the chamber after sealing the chamber; and igniting the fuel mixture in the chamber to remove one or more of the support walls of the support structure from the metallic component.

2. The method of claim 1, wherein introducing the fuel mixture into the chamber includes introducing the fuel mixture into at least one of the flow passages.

3. The method of claim 2, wherein the support walls that form the at least one of the flow passages are removed by igniting the fuel mixture.

4. The method of claim 1, further comprising:

introducing a second fuel mixture into the chamber after igniting the fuel mixture; and igniting the second fuel mixture to remove one or more of the support walls of the support structure from the metallic component.

5. The method of claim 1, wherein each of the support walls includes a thickness up to 0.020 inches.

6. The method of claim 1, wherein each of the support walls includes a thickness from 0.002 inches to 0.020 inches.

7. The method of claim 1, further comprising pressurizing the chamber prior to igniting the fuel mixture.

8. The method of claim 1, further comprising evacuating the air from the chamber after sealing the chamber and before introducing the fuel mixture into the chamber.

9. A method for manufacturing a metallic component, the method comprising:

determining a layout for a support structure for an overhanging surface of the metallic component, the support structure including support walls arranged in a lattice structure and forming flow passages with each passage including a cross-sectional area larger than a predetermined amount;

forming the metallic component with the support structure using an additive manufacturing process;

placing the metallic component with the support structure into a chamber and sealing the chamber;

introducing a fuel mixture into the chamber after sealing the chamber; and igniting the fuel mixture in the chamber to remove one or more of the support walls of the support structure from the metallic component.

10. The method of claim 9, wherein each of the support walls includes a thickness up to 0.020 inches.

11. The method of claim 9, further comprising pressurizing the chamber prior to igniting the fuel mixture.

12. The method of claim 9, further comprising evacuating the air from the chamber after sealing the chamber and before introducing the fuel mixture into the chamber.

13. The method of claim 9, wherein the steps of introducing the fuel mixture into the chamber and igniting the fuel mixture in the chamber are performed multiple times until all of the support structure is removed from the metallic component.

14. The method of claim 9, wherein introducing the fuel mixture into the chamber includes introducing the fuel mixture into at least one of the flow passages.

15. A method for manufacturing a metallic component, the method comprising:

forming the metallic component with a support structure using an additive manufacturing process, the support structure including support walls with a thickness up to 0.020 inches arranged in a lattice structure and forming flow passages with each passage including a cross-sectional area that is large enough to allow a fuel mixture and a flame to propagate there through without choking the flow and the flame propagation;

removing the metallic component and the support structure from a build plate used during the forming of the metallic component;

placing the metallic component with the support structure removed from the build plate into a chamber that is explosion-proof and sealing the chamber;

introducing the fuel mixture into the chamber after sealing the chamber including introducing the fuel mixture into at least one of the flow passages; and igniting the fuel mixture in the chamber to remove one or more of the support walls of the support structure from the metallic component.

16. The method of claim 15, further comprising pressurizing the chamber prior to igniting the fuel mixture.

17. The method of claim 16, wherein the support walls that form the at least one of the flow passages are removed by igniting the fuel mixture.

18. The method of claim 15, wherein the steps of introducing the fuel mixture into the chamber and igniting the fuel mixture in the chamber are performed multiple times until all of the support structure is removed from the metallic component.

19. The method of claim 15, further comprising evacuating the air from the chamber after sealing the chamber and before introducing the fuel mixture into the chamber.

20. The method of claim 15, wherein the fuel mixture includes fuel and oxygen.

* * * * *